US006987497B2

(12) United States Patent
Koyama

(10) Patent No.: US 6,987,497 B2
(45) Date of Patent: *Jan. 17, 2006

(54) SYSTEM FOR CORRECTING DISPLAY DEVICE AND METHOD FOR CORRECTING THE SAME

(75) Inventor: Jun Koyama, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/406,318

(22) Filed: Apr. 4, 2003

(65) Prior Publication Data
US 2003/0193489 A1 Oct. 16, 2003

Related U.S. Application Data

(62) Division of application No. 09/104,978, filed on Jun. 26, 1998, now Pat. No. 6,549,183, which is a division of application No. 08/407,685, filed on Mar. 21, 1995, now Pat. No. 5,793,344.

(30) Foreign Application Priority Data
Mar. 24, 1994 (JP) ..................................... 6-79533

(51) Int. Cl.
H04N 17/00 (2006.01)
(52) U.S. Cl. .................. 345/87; 345/89; 345/101; 345/904
(58) Field of Classification Search .................. 345/87
See application file for complete search history.

(56) References Cited

U.S. PATENT DOCUMENTS 5,216,504 A   6/1993  Webb et al.
5,245,326 A * 9/1993  Zalph ........................... 345/92
5,260,797 A  11/1993  Muraji et al.
5,319,459 A   6/1994  Mochizuki
5,452,019 A * 9/1995  Fukuda et al. ............... 348/655
5,473,394 A  12/1995  Hideyuki
5,555,028 A * 9/1996  Kim ............................ 348/607
5,793,344 A   8/1998  Koyama
5,874,988 A * 2/1999  Gu .............................. 348/97

FOREIGN PATENT DOCUMENTS

JP   05-154728   6/1993
JP   05-169356   7/1993

OTHER PUBLICATIONS

Television Conference Edition, "Television Image Information Technics Handbook," pp. 403-404, pp. 413-414, Ohm Co. Ltd., Nov. 30, 1990, Concise Statement.

* cited by examiner

Primary Examiner—Kent Chang
Assistant Examiner—Ming-Hun Liu
(74) Attorney, Agent, or Firm—Eric J. Robinson; Robinson Intellectual Property Law Office, P.C.

(57) ABSTRACT

In a display device having a nonvolatile memory device, such as an active matrix type liquid crystal display device, display contents displayed on the display device are obtained by a camera device. The obtained information (corresponding to the display contents) is digital-converted and then processed to detect a defect and a nonuniformity on the display device, so that correction information is produced. The correction information is stored in the nonvolatile memory device of the display device. Display information to be displayed on the display device is processed using the stored correction information, so that display contents are corrected and a defect and a nonuniformity on the display contents are inconspicuous.

7 Claims, 9 Drawing Sheets

SOURCE TERMINAL VOLTAGE

GATE TERMINAL VOLTAGE

DRAIN TERMINAL VOLTAGE

FIG. 7

|   |   |   |   |   |   |   |   |
|---|---|---|---|---|---|---|---|
|   |   |   |   |   |   |   |   |
|   |   |   |   |   |   |   |   |
|   | X |   |   |   |   |   |   |
|   | X |   |   |   |   |   |   |
|   | X |   |   |   | X | X |   |
|   |   |   |   |   |   | X | X |
|   |   |   |   |   |   |   |   |
|   |   |   |   |   |   |   |   |

FIG. 8

| 43 | 44 | 45 | 46 | 47 | 48 | 49 | 50 |
|----|----|----|----|----|----|----|----|
| 44 | 45 | 46 | 47 | 48 | 49 | 50 | 51 |
| 45 | 50 | 47 | 48 | 49 | 50 | 51 | 52 |
| 46 | 51 | 48 | 49 | 50 | 51 | 52 | 53 |
| 47 | 52 | 49 | 50 | 51 | 48 | 49 | 54 |
| 48 | 49 | 50 | 51 | 52 | 48 | 49 | 55 |
| 49 | 50 | 51 | 52 | 53 | 54 | 55 | 56 |
| 50 | 51 | 52 | 53 | 54 | 55 | 56 | 57 |

FIG. 9

| +7 | +6 | +5 | +4 | +3 | +2 | +1 | 0  |
|----|----|----|----|----|----|----|----|
| +6 | +5 | +4 | +3 | +2 | +1 | 0  | -1 |
| +5 | 0  | +3 | +2 | +1 | 0  | -1 | -2 |
| +4 | -1 | +2 | -1 | 0  | -1 | -2 | -3 |
| +3 | -2 | +1 | 0  | -1 | +2 | +1 | -4 |
| +2 | +1 | 0  | -1 | -2 | +2 | +1 | -5 |
| +1 | 0  | -1 | -2 | -3 | -4 | -5 | -6 |
| 0  | -1 | -2 | -3 | -4 | -5 | -6 | -7 |

FIG. 10

| 20 | 20 | 40 | 40 | 60 | 60 | 80 | 80 |
|----|----|----|----|----|----|----|----|
| 20 | 20 | 40 | 40 | 60 | 60 | 80 | 80 |
| 20 | 20 | 40 | 40 | 60 | 60 | 80 | 80 |
| 20 | 20 | 40 | 40 | 60 | 60 | 80 | 80 |
| 20 | 20 | 40 | 40 | 60 | 60 | 80 | 80 |
| 20 | 20 | 40 | 40 | 60 | 60 | 80 | 80 |
| 20 | 20 | 40 | 40 | 60 | 60 | 80 | 80 |
| 20 | 20 | 40 | 40 | 60 | 60 | 80 | 80 |

FIG. 11

| 27 | 26 | 45 | 44 | 63 | 62 | 81 | 80 |
|----|----|----|----|----|----|----|----|
| 26 | 25 | 44 | 43 | 62 | 61 | 80 | 79 |
| 25 | 20 | 43 | 42 | 61 | 60 | 79 | 78 |
| 24 | 19 | 42 | 41 | 60 | 59 | 78 | 77 |
| 23 | 18 | 41 | 40 | 59 | 62 | 81 | 76 |
| 22 | 21 | 40 | 39 | 58 | 62 | 81 | 75 |
| 21 | 20 | 39 | 38 | 57 | 56 | 75 | 74 |
| 20 | 19 | 38 | 37 | 56 | 55 | 74 | 73 |

FIG. 12

| 43 | 44 | 45 | 46 | 47 | 48 | 49 | 50 |
|----|----|----|----|----|----|----|----|
| 44 | 45 | 46 | 47 | 48 | 49 | 50 | 51 |
| 45 | 46 | 47 | 48 | 49 | 50 | 51 | 52 |
| 46 | 47 | 48 | 49 | 50 | 51 | 52 | 53 |
| 47 | 48 | 49 | 50 | 51 | 52 | 53 | 54 |
| 48 | 49 | 50 | 51 | 52 | 53 | 54 | 55 |
| 49 | 50 | 51 | 52 | 53 | 54 | 55 | 56 |
| 50 | 51 | 52 | 53 | 54 | 55 | 56 | 57 |

FIG. 13

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | -4 | 0 | 0 | 0 | 0 | 0 | 0 |
| 0 | -4 | 0 | 0 | 0 | 0 | 0 | 0 |
| 0 | -4 | 0 | 0 | 0 | +4 | +4 | 0 |
| 0 | 0 | 0 | 0 | 0 | +5 | +5 | 0 |
| 0 | 0 | 0 | 0 | 0 | 0 | 0 | 0 |
| 0 | 0 | 0 | 0 | 0 | 0 | 0 | 0 |

FIG. 14

| 20 | 20 | 40 | 40 | 60 | 60 | 80 | 80 |
|---|---|---|---|---|---|---|---|
| 20 | 20 | 40 | 40 | 60 | 60 | 80 | 80 |
| 20 | 16 | 40 | 40 | 60 | 60 | 80 | 80 |
| 20 | 16 | 40 | 40 | 60 | 60 | 80 | 80 |
| 20 | 16 | 40 | 40 | 60 | 64 | 84 | 80 |
| 20 | 20 | 40 | 40 | 60 | 65 | 85 | 80 |
| 20 | 20 | 40 | 40 | 60 | 60 | 80 | 80 |
| 20 | 20 | 40 | 40 | 60 | 60 | 80 | 80 |

FIG. 15

| 13 | 14 | 35 | 36 | 57 | 58 | 79 | 80 |
|---|---|---|---|---|---|---|---|
| 14 | 15 | 36 | 37 | 58 | 59 | 80 | 81 |
| 15 | 16 | 37 | 38 | 59 | 60 | 81 | 82 |
| 16 | 17 | 38 | 39 | 60 | 61 | 82 | 83 |
| 17 | 18 | 39 | 40 | 61 | 62 | 83 | 84 |
| 18 | 19 | 40 | 41 | 62 | 63 | 84 | 85 |
| 19 | 20 | 41 | 42 | 63 | 64 | 85 | 86 |
| 20 | 21 | 42 | 43 | 64 | 65 | 86 | 87 |

SYSTEM FOR CORRECTING DISPLAY DEVICE AND METHOD FOR CORRECTING THE SAME

BACKGROUND OF THE INVENTION

The present invention relates to a display correction system for a display device, in particular, a display device having a nonvolatile memory device and a display device correction method.

As a conventional display device, a cathode ray tube (CRT) device, a plasma display device, a liquid crystal display (LCD) device or the like is used. Recently, an LCD device, in particular, an active matrix type LCD device has been developed.

Since a dielectric constant of a liquid crystal substance (molecule) in a parallel direction to a molecule axis is different from that in a vertical direction, an LCD device uses this characteristic and displays ON/OFF states, that is, light/dark states by adjusting a transmission quantity or a scattering quantity of a light. In general, a liquid crystal material includes, a twisted nematic (TN) liquid crystal, a super twisted nematic (STN) liquid crystal, a ferroelectric liquid crystal and the like.

It is said that among display devices using a liquid crystal, an active matrix type LCD device has a superior display characteristic. As shown in FIG. 2, in a conventional active matrix type LCD device, source lines 203 to 205 connected to a source driver 201 are combined with gate lines 206 to 208 connected to a gate driver 202 in a matrix form, and thin film transistors (TFTs) 209 to 212 are arranged in these intersection portions. Gate electrodes in TFTs are connected to the gate lines 206 to 208, source electrodes in the TFTs are connected to the source lines 203 to 205, and drain electrodes in the TFTs are connected to pixel electrodes and retaining capacitors 213 to 216. Liquid crystal 217 to 220 are arranged between the pixel electrodes.

FIGS. 3A to 3C show operation waveforms of the TFT. When signal voltages are applied to the gate electrode and the source electrode of the TFT, the TFT is turned on, so that a voltage on the pixel electrode almost coincides with a source voltage. When the signal voltage is not applied to the gate electrode of the TFT, the TFT is turned off, so that a voltage on the pixel electrode is maintained until the TFT is turned on next.

Since a voltage is applied from the pixel electrode to the liquid crystal by the above manner, an LCD device having less crosstalk and a large contrast with respect to adjacent pixels can be produced.

In an active matrix type LCD device described above, since the necessary number of TFTs corresponds to the number of pixels, a defect produces in a TFT element formed in a substrate. If a TFT having a defect is in an open state or a short circuit state, a defect pixel has a desired voltage or a voltage on the defect pixel is unstable, so that the pixel produces as a point defect on a panel. Also, by variations of a threshold value and a mobility in a TFT, a voltage applied to a pixel electrode is varied, so that variations in brightness (gradation) of pixels produce.

To solve the above problem, as shown in FIG. 4, in a pixel portion having gate lines 401 and 402 and source lines 403 and 404, a plurality of TFTs 405 and 406 are arranged for one pixel electrode 407 to obtain redundancy. That is, if the TFT 406 is a defective element, a drain terminal is scribed (cut) in a laser scribing portion 408 using a laser or the like to remove a defective element.

A defective element is detected by using a structure as shown in FIG. 5. In FIG. 5, the structure includes gate lines 501 and 502, source lines 503 and 504, common electrode line 505, TFTs 506 to 509, retaining capacitors 510 and 511, switches 512 to 515, amplifiers 516 and 517, measurement terminals 518 and 519 and power sources 520 and 521. A voltage by which a TFT is turned on sufficiently is applied to the gate lines 501 and 502 connected to elements to be examined through the switches 512 and 513 and simultaneously a desired voltage is applied to the source lines 503 and 504 connected to the elements through the switches 514 and 515. Next, a voltage on the gate lines is set to a ground level, to turn off the TFTs.

Application of the voltage to the source lines is stopped and then the TFTs are leaved for a desired period of time. After that, a voltage is applied to the gate lines again and then a voltage on the source lines is measured. When the TFTs are in a normal state, since a first source voltage is maintained by the retaining capacitors, it is measured. Also, When a drain and a source in each TFT are in a short circuit state, since discharge produces in each TFT through resistors connected to the source lines while leaving the TFTs, a voltage is varied in measurement. Further, when the TFTs are in an open state, even though a voltage is applied to the gate lines, the voltage is not applied to the retaining capacitors. Furthermore, even through the retaining capacitors are charged insufficiently by variations of mobility and threshold of the TFT, a defect element can be distinguished by voltage measurement with high accuracy.

In a conventional LCD device and a correction method for the device, as described above, the following problems produce. Though a defect of a pixel TFT can be corrected, a nonuniform display due to variation of a liquid crystal material and a band nonuniformity produced by rubbing cannot be corrected, so that an LCD device becomes a defective product in many cases.

In general, when an operator watches a display device, two pixels which are sufficiently apart from each other cannot be distinguished even though a brightness (gradation) difference between one pixel and the other pixel is 10% or more. However, adjacent pixels are distinguished each other even though the brightness difference is about 2%. Therefore, it is important to suppress variations of brightness between adjacent pixels.

An LCD device has a tendency to extend a size of a display portion (screen portion). In accordance with an increase of the size, it is difficult to maintain uniform display, so that a yield of an LCD device is deteriorated. Also, in a personal computer and a work station, since an operator continues to watch a display portion at a near position for a long period of time, nonuniform display is disagreeable for an operator and efficiency of the operator decreases, so that it is a claim subject from a user.

SUMMARY OF THE INVENTION

The object of the present invention is to solve the above problem. In the present invention, a liquid crystal display (LCD) device includes a memory device for storing correction contents of pixel, and correction is performed by storing into the memory device the correction contents obtained by an external camera device, so that uniform display can be performed.

According to the present invention, there is provided a correction system comprising: a display device having a nonvolatile memory; and a correction data producing device, wherein the correction data producing device includes, an obtaining circuit for obtaining an image signal displayed on the display device, a converter for converting the image signal into digital data, a signal processor for processing the digital data to obtain correction data, and a writing circuit for writing the correction data into the nonvolatile memory.

According to the present invention, there is provided a method for operating a correction system including a display device and a correction data producing device, wherein the display device has a nonvolatile memory, and the correction data producing device includes an obtaining circuit for obtaining an image signal displayed on the display device, a converter for converting the image signal into digital data, a signal processor for processing the digital data to obtain correction data, and a writing circuit for writing the correction data into the nonvolatile memory, the method comprising the step of processing the correction data stored in the nonvolatile memory and the image signal to be displayed on the display device, to correct the image signal.

According to the present invention, there is provided a display device comprising: a display portion for displaying image data; a driver for driving the display portion; a memory for storing correction data for correcting a nonuniform display of the display portion; and a processor for adding the stored correction data to the image data to obtain corrected image data, wherein the corrected image data is displayed on the display portion.

BRIEF DESCRIPTION OF THE DRAWINGS

FIGS. 7 to 15 show information to be processed or to be displayed in the correction system of the present invention.

DETAILED DESCRIPTION OF THE PREFERRED EMBODIMENTS

[Embodiment 1]

Figure 1:
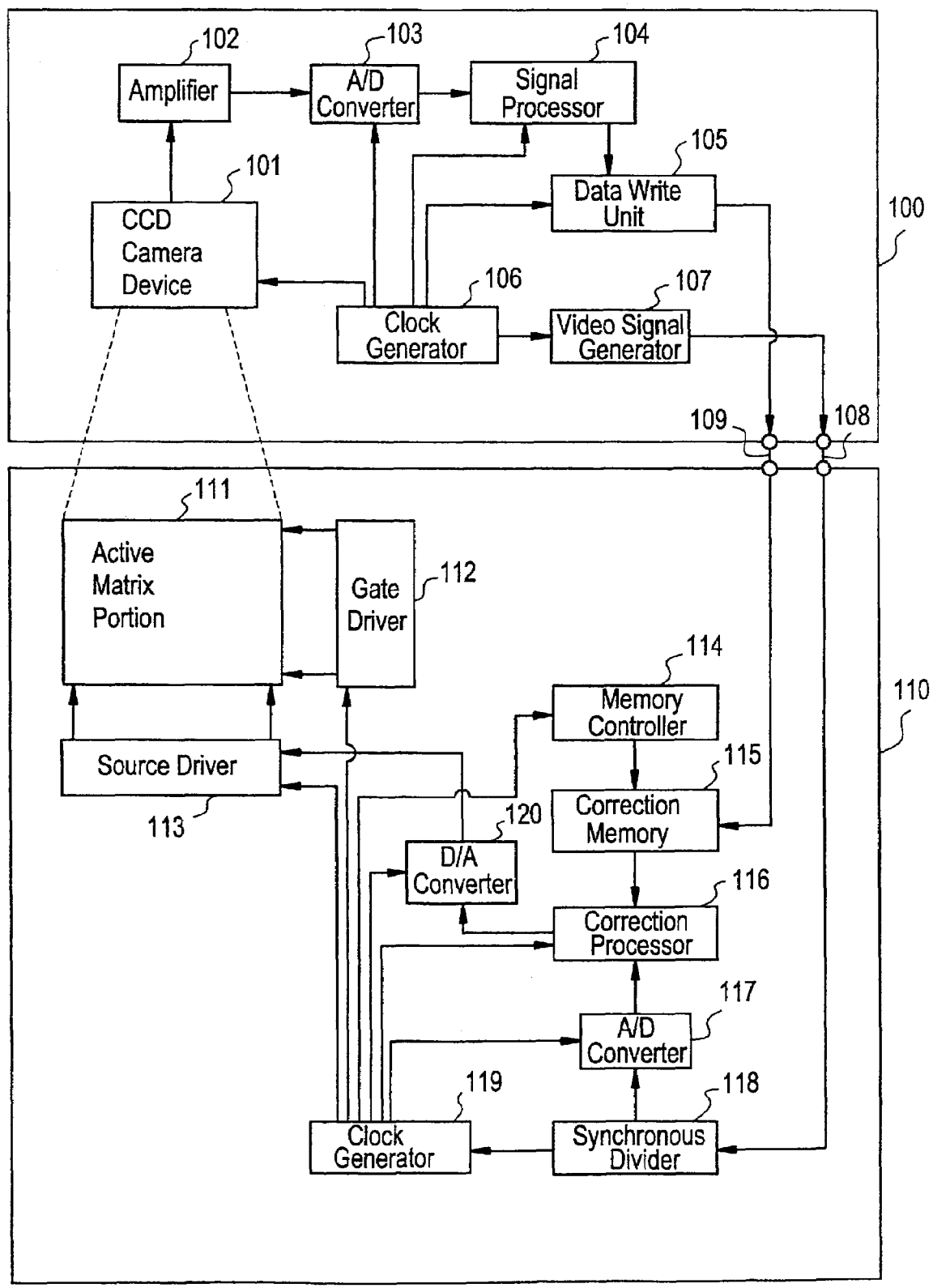
FIG. 1 shows a correction system having a liquid crystal display (LCD) device according to an embodiment of the present invention.
Figure 2:
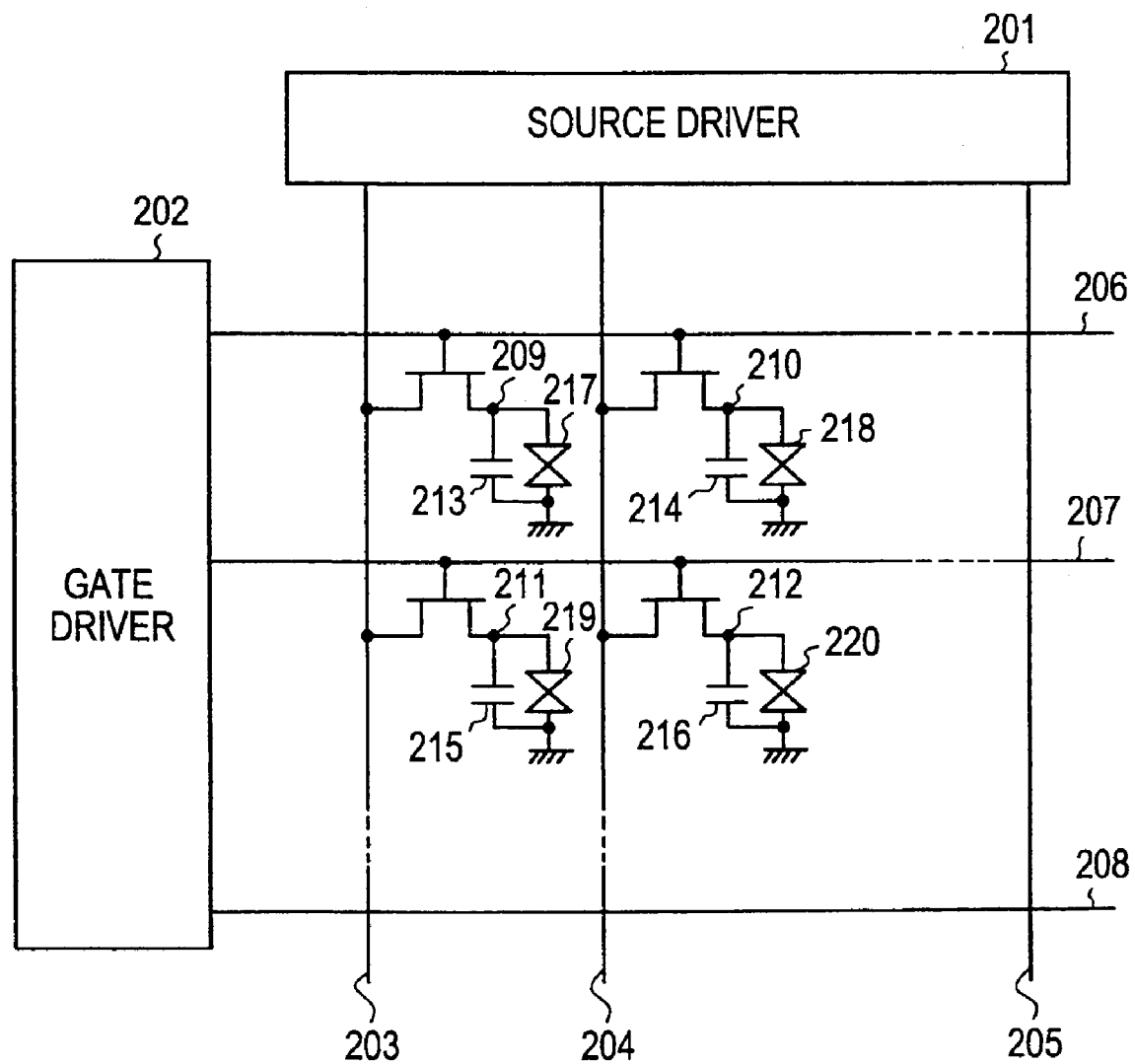
FIG. 2 is a schematic structure view of a conventional active matrix type LCD device.
Figure 3A:
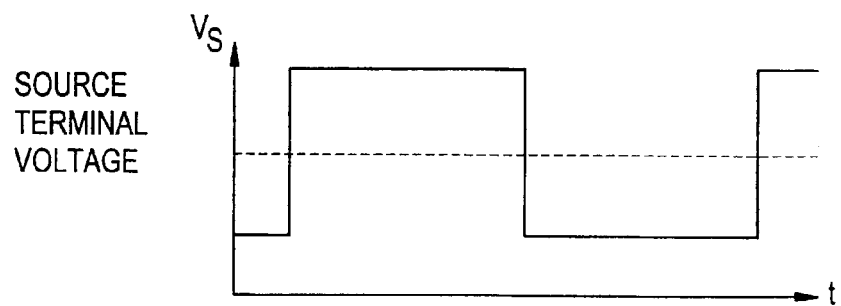
FIGS. 3A to 3C are operation waveforms of a thin film transistor (TFT)
Figure 3B:
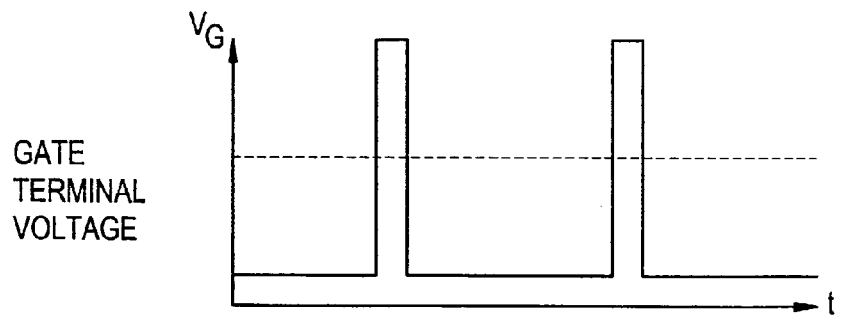
Figure 3C:
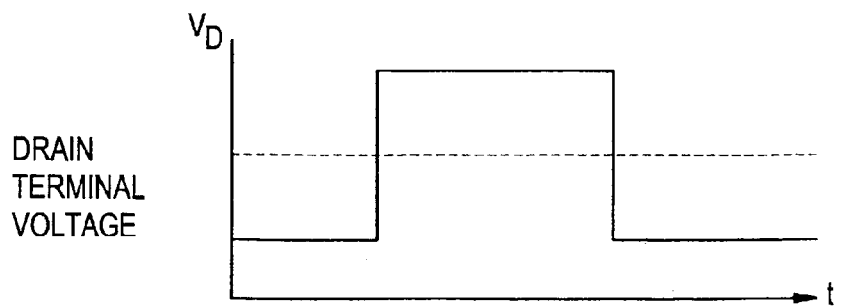
Figure 4:
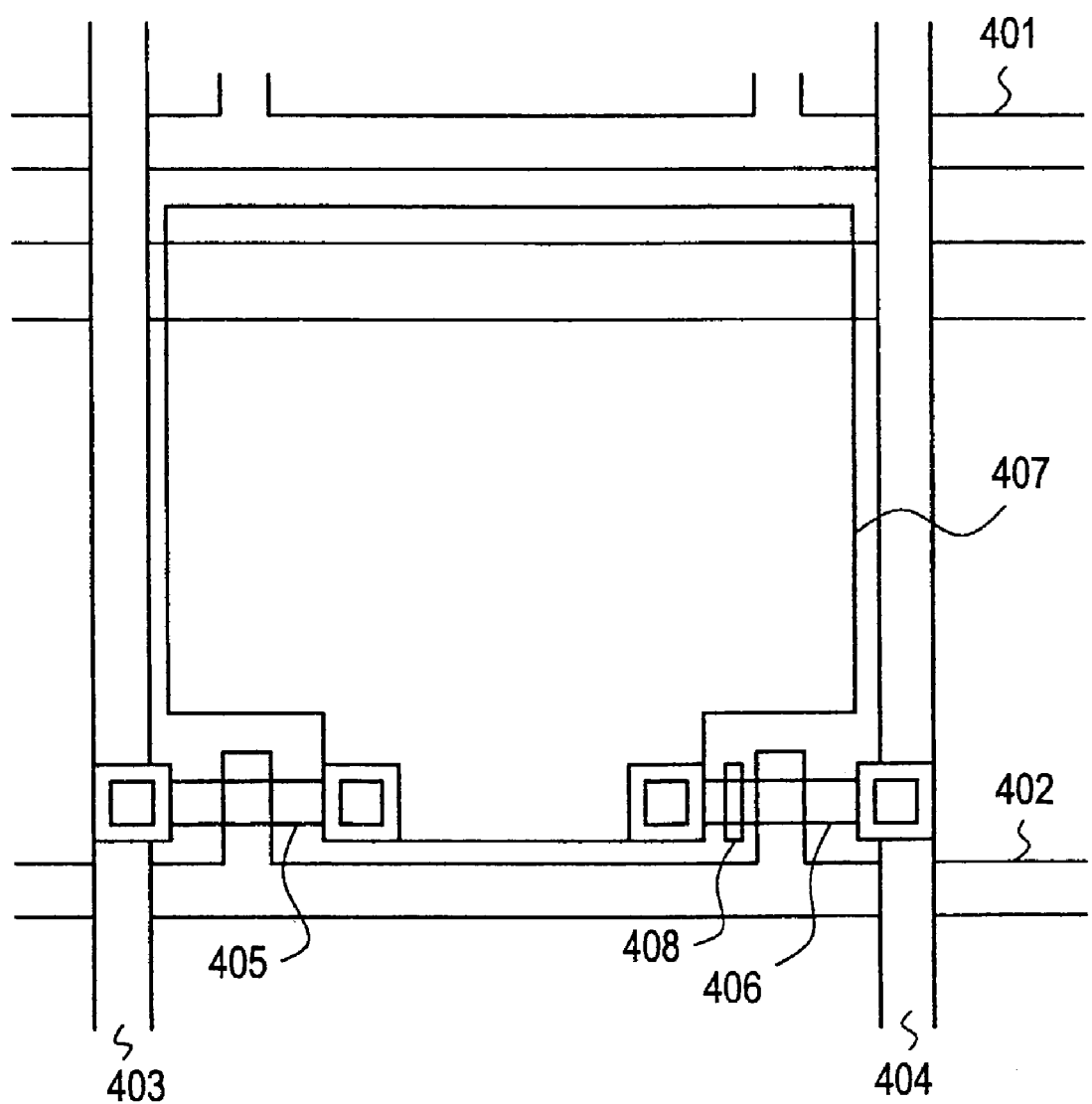
FIG. 4 shows a pixel region of the conventional active matrix type LCD device.
Figure 5:
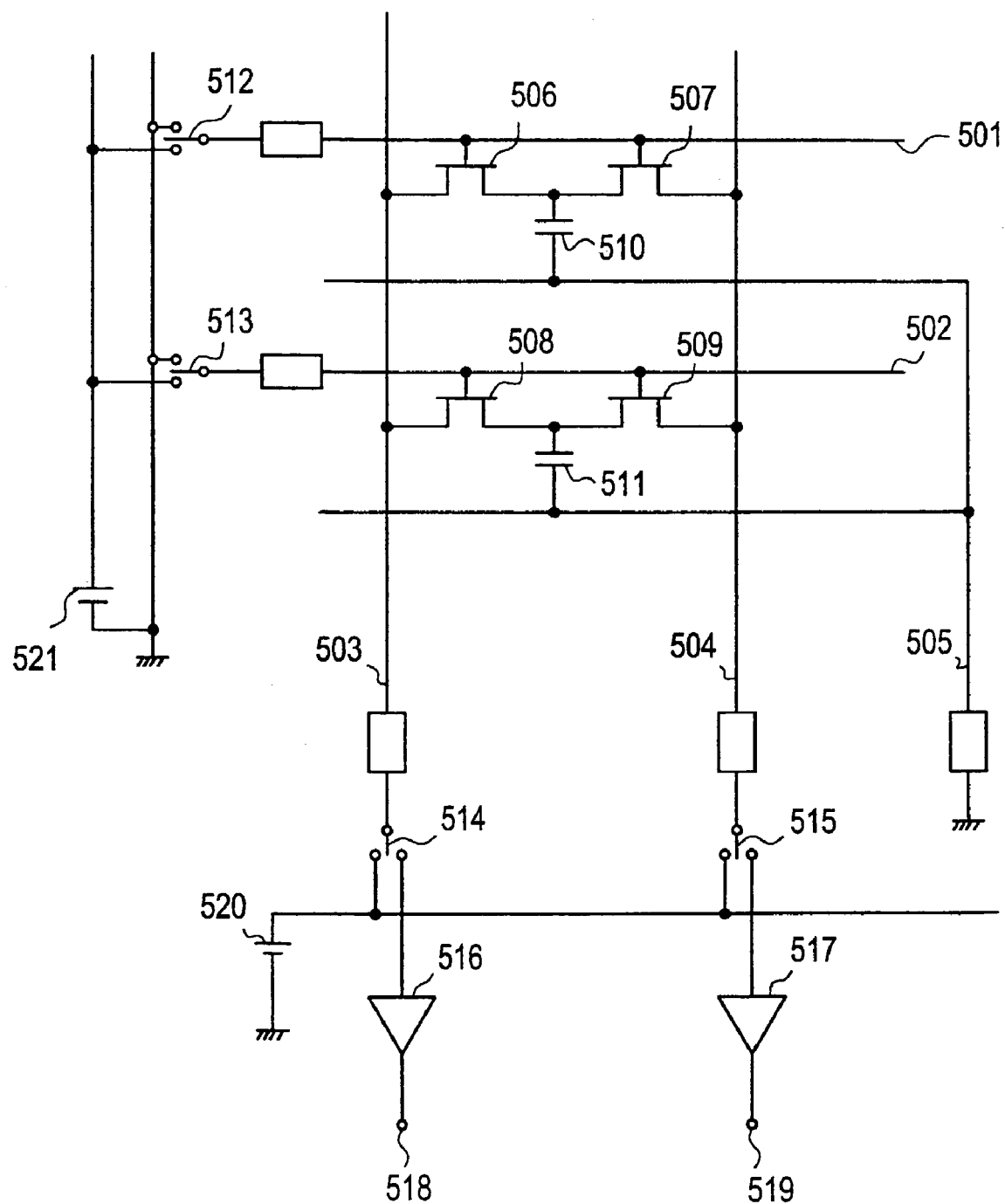
FIG. 5 shows an active matrix portion including a measurement circuit for examining the conventional active matrix type LCD device.

FIG. 1 shows a correction system having a liquid crystal display (LCD) device according to an embodiment of the present invention. In FIG. 1, the correction system includes an LCD device 110 formed on a glass substrate (not shown) and a correction information (correction data) producing device 100. The LCD device 110 has an active matrix portion 111, a gate driver 112, a source driver 113, a memory controller 114, a memory device (a correction memory 115), a correction processor 116, an analog/digital (A/D) converter 117, a synchronous divider 118, a clock generator 119 and a digital/analog (D/A) converter 120.

The correction information producing device 100 produces correction information used to correct the LCD device 110 and then writes the produced correction information into the correction memory 115. The device 100 has a charge coupled device (CCD) camera device 101, an amplifier 102, an A/D converter 103, a signal processor 104, a data write unit 105, a clock generator 106 and a video signal generator 107. The devices 100 and 110 are connected with each other by connection terminals 108 and 109.

Correction is performed for the LCD device 110. After the correction is completed, the device 100 is disconnected from the device 110. After that, the device 100 is connected to another LCD device through the connection terminals 108 and 109 and then next correction is performed.

In the correction information producing device 100, a video signal output from the video signal generator 107 is input to the A/D converter 117 through the synchronous divider 118 of the LCD device 110, so that the video signal is digital-converted. The digital converted video signal is input to the correction processor 116. Since in an initial-stage, correction is not performed in the correction processor 116, the video signal is input to the D/A converter 120, so that the video signal is analog-converted. After that, the analog-converted video signal is input to the active matrix portion 111 through the source driver 113, so that a display is performed. Until this stage, the same operation as that of a conventional LCD device is performed.

Correction information (correction data) is produced as follows.

Optical display contents displayed on the active matrix portion 111 of the LCD device 110 are obtained by the CCD camera device 101 of the correction information producing device 100. The CCD camera device 101 has a CCD camera and the like. Since a video signal output from the device 101 is generally a weak signal, it is amplified by the amplifier 102. The amplified video signal is digital-converted by the A/D converter 103 and then input to the signal processor 104.

In the signal processor 104, a noise component and a moire component are removed from the video signal, to detect only information with respect to a defect of a pixel and a nonuniformity in the LCD device 110. To easily detect a defect and a nonuniformity, it is desired that display contents displayed in the active matrix portion 111 have the same color and the same brightness (gradation).

To detect a defect and a nonuniformity, three methods as described below can be used. In a first method, a difference between a desired standard level and a level of a signal input to the signal processor 104 is obtained and then used as a correction value. In a second method, a small changing component of a signal (original signal) input to the signal processor 104 is extracted using a median filter and then an extracted result is subtracted from the original signal, to detect a singular point. In a third method, a large changing component of the signal is extracted using a Laplacian filter to detect a singular point. When a singular point is detected using the median filter or the Laplacian filter, since correction information is only information with respect to the singular point, it does not represent a small change of brightness in a display device. However, as described above, no problem produces because an eye of a human is insensitive with respect to a small change.

An output of the signal processor 104 is written into the correction memory 115 of the LCD device 110 by the data write unit 105. The data writing is performed by a desired method in response to a kind of the correction memory 115 controlled by the memory controller 114. The clock generator 106 controls the CCD camera device 101, the A/D converter 103, the signal processor 104, the data write unit 105 and the video signal generator 107. A correction operation is completed after the data writing to the correction memory 115 is performed.

After the correction operation is completed, the correction information producing device 100 is disconnected from the LCD device 110, so that the LCD device 110 is connected to a system such as a personal computer body.

When a video (image) signal output from the system is input to the LCD 110 to perform a display, the video signal is digital-converted by the A/D converter 117 through the synchronous divider 118. The digital-converted video signal is processed and corrected using correction data stored in the correction memory 115 by the correction processor 116. The corrected video signal is input to the source driver 113 through the D/A converter 120. The gate driver 112 is controlled by the clock generator 119. The clock generator 119 also controls the source driver 113, the memory controller 114, the correction processor 116, the A/D converter 117 and the synchronous divider 118. In the active matrix portion 111, the corrected video signal is displayed.

FIGS. 7 to 15 show information to be processed or to be displayed in the correction system of the present invention.

FIG. 7 shows a display result of the active matrix portion 111 before correction is performed. In FIG. 7, though a matrix size of the active matrix portion 111 is 8×8, the size is arbitrary. A symbol x represents a nonuniform portion (pixel). A brightness (gradation) level is within 0 to 100 and brightness to be displayed is uniformly 50.

FIG. 8 shows display information obtained after the display contents of FIG. 7 are obtained by the CCD camera device 101 and then digital-converted by the A/D converter 103. A difference between a brightness value of a portion in which nonuniformity produces and that of surrounding portions is large. In a whole display portion, a brightness value is changed gradually from an upper left to a lower right. However, as described above, no problem produces on visual sensation of a human because a change is small.

FIG. 9 shows a result representing a difference between brightness (50) to be displayed and display information of FIG. 8. This result is obtained by the signal processor 104 and used as correction information.

FIG. 10 shows a result obtained by digital-converting a video signal to be newly displayed after correction information is produced (obtained). This result represents output information of the A/D converter 117.

FIG. 11 shows a result obtained by adding information of FIG. 9 to information of FIG. 10 in the correction processor 116. This result represents output information of the correction processor 116. When the output information is input to the active matrix portion 111, a nonuniformity of a display portion on the active matrix portion 111 is corrected, so that the information of FIG. 10 is displayed on the active matrix portion 111.

FIG. 12 shows a result obtained by processing the display information of FIG. 8 using an median filter in the signal processor 104, without performing simply subtraction.

FIG. 13 shows a result obtained by subtracting the result of FIG. 12 from the display information of FIG. 8. This result represents correction information. The median filter passes only a small change component of the video signal (display information) and therefore removes nonuniformity information. Original information is subtracted from information obtained after the nonuniformity information is removed, so that the nonuniformity information can be obtained.

When a Laplacian filter is used, information representing a large change point can be obtained. FIG. 14 shows a result obtained by adding the correction information of FIG. 13 to the information of FIG. 10 in the correction processor 116. This result represents output information of the correction processor 116.

FIG. 15 shows display information displayed on the active matrix portion 111. The display information includes a small change component but does not include a large change component, so that nonuniformity on a display portion can be inconspicuous.

In the embodiment, though an analog gradation type driver is used, a digital gradation type driver may be used. When the digital gradation type driver is used, the D/A converter 120 is not required. Also, when the video signal generator 107 generates a digital signal and when a digital video signal is input to the LCD device 110, the A/D converter 117 is not also required.

The data write unit 105 is a read only memory (ROM) writer or the like. Also, the correction memory 115 is a nonvolatile memory such as an electrically programmable ROM (EPROM), an electrically erasable programmable ROM (EEPROM), a flash memory or the like. These memory are a semiconductor memory. The correction memory 115 may be arranged on a glass substrate of the LCD device 110 by a chip on glass (COG) technique, or may be arranged on another substrate other than the glass substrate.

A driver circuit for driving a pixel TFT may be formed on a glass substrate using TFTs simultaneously in forming an active matrix portion, or a single crystalline chip corresponding to the driver circuit may be arranged by the COG technique or a tape automated bonding (TAB), as similar to the correction memory 115.

[Embodiment 2]

Figure 6:
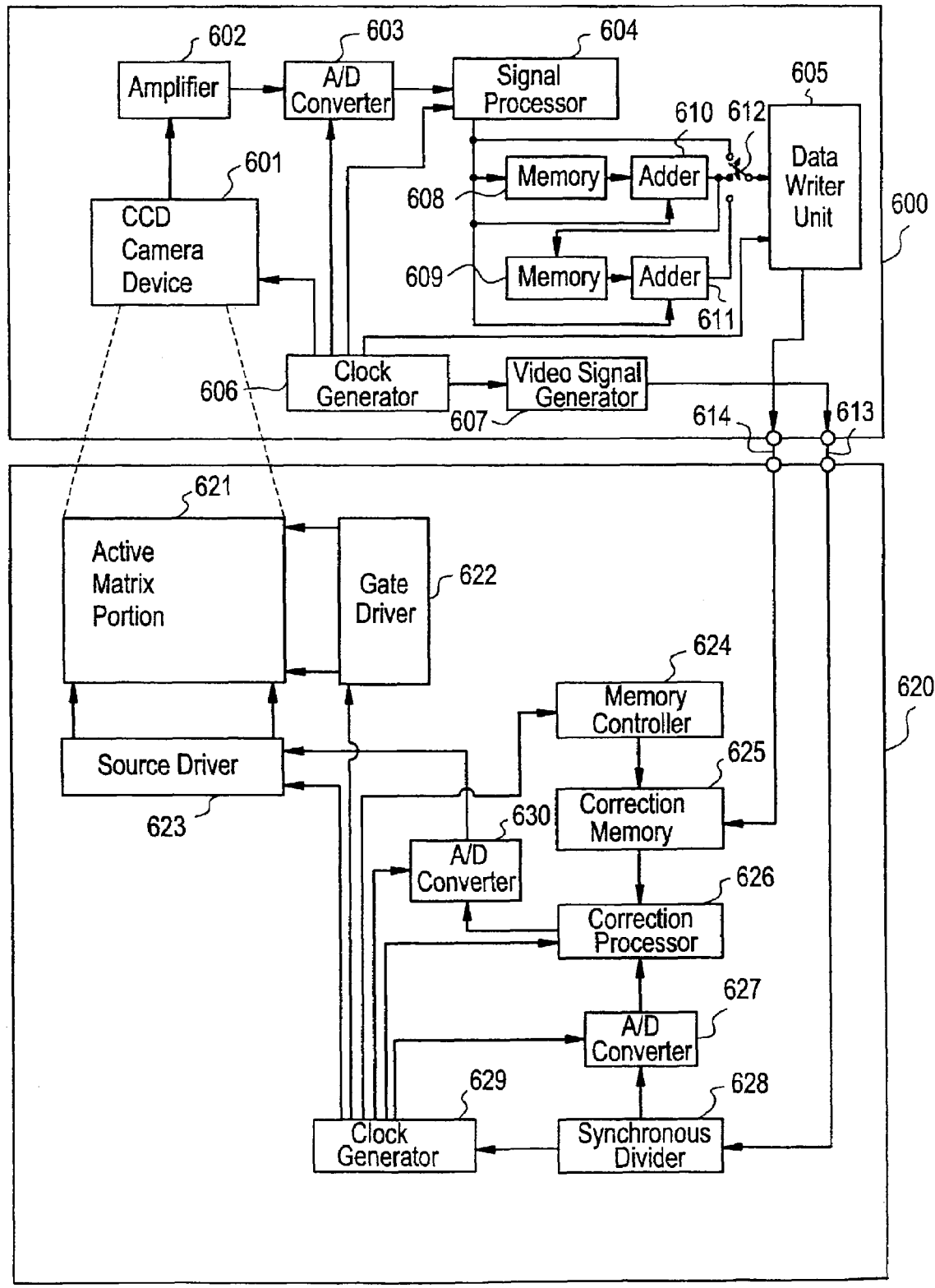
FIG. 6 shows a correction system having an LCD device according to another embodiment of the present invention.

FIG. 6 show a correction system having an LCD device according to another embodiment of the present invention. The embodiment is different from Embodiment 1, and obtainment and correction of display information to be displayed are performed a plurality of times.

In FIG. 6, a correction system of the embodiment includes an LCD device 620 formed on a glass substrate (not shown) and a correction information (correction data) producing device 600. The LCD device 620 has an active matrix portion 621, a gate driver 622, a source driver 623, a memory controller 624, a memory device (a correction memory 625), a correction processor 626, an A/D converter 627, a synchronous divider 628, a clock generator 629 and a D/A converter 630.

The correction information producing device 600 produces correction information used to correct the LCD device 620 and then writes the produced correction information into the correction memory 625. The device 600 has a CCD camera device 601, an amplifier 602, an A/D converter 603, a signal processor 604, a data write unit 605, a clock generator 606, a video signal generator 607, memories 608 and 609, adders 610 and 611 and a switch 612. The devices 600 and 620 are connected with each other by connection terminals 613 and 614.

Correction is performed for the LCD device 620. After the correction is completed, the device 600 is disconnected from the device 620. After that, the device 600 is connected to another LCD device through the connection terminals 613 and 614 and then next correction is performed.

In the correction information producing device 600, a video signal output from the video signal generator 607 is input to the A/D converter 627 through the synchronous divider 628 of the LCD device 620, so that the video signal is digital-converted. The digital converted video signal is input to the correction processor 626. Since in an initial stage, correction is not performed in the correction processor 626, the video signal is input to the D/A converter 630, so that the video signal is analog-converted. After that, the analog-converted video signal is input to the active matrix portion 621 through the source driver 623, so that a display is performed. Until this stage, the same operation as that of a conventional LCD device is performed.

Correction information (correction data) is produced as follows.

Optical display contents displayed on the active matrix portion 621 of the LCD device 620 are obtained by the CCD camera device 601 of the correction information producing device 600. The CCD camera device 601 has a CCD camera and the like. Since a video signal output from the device 601 is generally a weak signal, it is amplified by the amplifier 602. The amplified video signal is digital-converted by the A/D converter 603 and then input to the signal processor 604.

In obtaining first display contents, correction information obtained by the signal processor 604 is stored in the memory 608. The correction information is also stored in the correction memory 625 through the switch 612 and data write unit 605. After correction is performed similar to Embodiment 1, a display is performed again and then second display contents are obtained. Correction information (with respect to the second display contents) obtained by the signal processor 604 is added to the correction information (with respect to the first display contents) stored in the memory 608 by the adder 610, so that the added correction information is stored in the memory 609 and the correction memory 625. The LCD device 620 is corrected again. After that, a display is performed and then third display contents are obtained. Output information of the signal processor 604 is added to the correction information (with respect to the second display contents) stored in the memory 609 by the adder 611 and then stored in the correction memory 625 through the switch 612 and the data write unit 605.

By repeating obtainment and correction of display information a plurality of times, further high precise correction can be performed. In the embodiment, though correction is performed three times, correction may be performed two times, four times or more.

In driving the correction memory and the active matrix portion, the same operation as Embodiment 1 is performed.

The present invention is not different from a conventional correction method using a pixel TFT having redundancy. By combining the correction method of the present invention with the conventional correction method, further improved effect can be obtained.

As described above, in the present invention, information with respect to a defect and a nonuniformity is stored in a memory device incorporated in an LCD device, a video signal input to the LCD device is processed using the stored information, and then a defect and a nonuniformity on a display portion of the LCD device is corrected, so that high quality display can be performed.

What is claimed is:

1. A method of manufacturing an active matrix type display device, the active matrix type display device being able to correct a video signal, comprising:
   providing a display device comprising
      an active matrix type display panel; and
      a nonvolatile memory;
   connecting a correction information producing device to the active matrix type display device;
   displaying an image using a video signal on the active matrix type display panel;
   obtaining an analog video signal from the displayed image;
   converting the analog video signal into a digital video signal;
   processing the digital video signal to obtain a correction information; and
   writing the correction information into the nonvolatile memory,
   wherein the processing is conducted by:
      comparing a desired level with a level of the digital video data; and
      detecting a difference between the desired level and the level of the digital video signal as the correction information.

2. A method of manufacturing an active matrix type display device, the active matrix type display device being able to correct a video signal, comprising:
   providing an active matrix type display device comprising
      an active matrix type display panel; and
      a nonvolatile memory;
   connecting a correction information producing device to the active matrix type display device;
   displaying an image using a video signal on the active matrix type display panel;
   obtaining an analog video signal from the displayed image;
   converting the analog video signal into a digital video signal;
   processing the digital video signal to obtain a correction information; and
   writing the correction information into the nonvolatile memory, wherein the processing is conducted by processing the digital video signal using at least one selected from the group consisting of a Laplacian filter and a median filter so as to detect a singular point.

3. A method of manufacturing an active matrix type display device, the active matrix type display device being able to correct a video signal, comprising:
   providing an active matrix type display device comprising
      an active matrix type display panel; and
      a nonvolatile memory;
   connecting a correction information producing device to the active matrix type display device comprising;
      a memory circuit for storing the correction information;
      an adding circuit for adding the correction information;
   displaying an image using a video signal on the active matrix type display panel;
   obtaining an analog video signal from the displayed image;
   converting the analog video signal into a digital video signal;
   processing the digital video signal to obtain a preceding correction information;
   storing the preceding correction information into the memory circuit;
   writing the preceding correction information into the nonvolatile memory;
   displaying an image using a video signal corrected by the preceding correction information;
   obtaining an analog video signal from the displayed image again;
   converting the analog video signal into a digital video signal;
   processing the digital video signal to obtain a correction information;

adding the correction information to the preceding correction information to obtain a following correction information; and writing the following correction information into the nonvolatile memory again, wherein the steps from the step displaying an image using a video signal corrected by the preceding correction information to the step of writing the following correction information are repeated n times, n being a natural number.

4. A method according to claim 1,
wherein the active matrix type display device further comprises a driver comprising a thin film transistor.

5. A method according to claim 2,
wherein the active matrix type display device further comprises a driver comprising a thin film transistor.

6. A method according to claim 3,
wherein the active matrix type display device further comprises a driver comprising a thin film transistor.

7. A method for operating an active matrix type display device,
wherein the active matrix type display device comprising:
an active matrix type display panel;
a gate driver;
a source driver;
a synchronous divider;
an A/D converter;
a nonvolatile memory storing a correction information;
a correction processor;
a D/A converter;
the method comprising:
inputting an analog video signal to the A/D converter through the synchronous divider,
converting the analog video signal to a digital video signal by the A/D converter;
inputting the digital video signal to the correction processor;
inputting the correction information from the nonvolatile memory;
correcting the digital video signal in the correction processor by the correction information;
inputting the corrected digital video signal to the D/A converter;
converting the corrected digital video signal to a corrected analog video signal by the D/A converter;
inputting the corrected analog video signal to the source driver; and
displaying an image on the active matrix type display device by the corrected analog video signal inputted to the source driver.

* * * * *

UNITED STATES PATENT AND TRADEMARK OFFICE
CERTIFICATE OF CORRECTION

PATENT NO. : 6,987,497 B2  Page 1 of 1
APPLICATION NO. : 10/406318
DATED : January 17, 2006
INVENTOR(S) : Jun Koyama It is certified that error appears in the above-identified patent and that said Letters Patent is hereby corrected as shown below:

In Figure 6 of the patent, please replace the text "A/D converter" associated with reference number 630 with --D/A converter--, as shown at right:

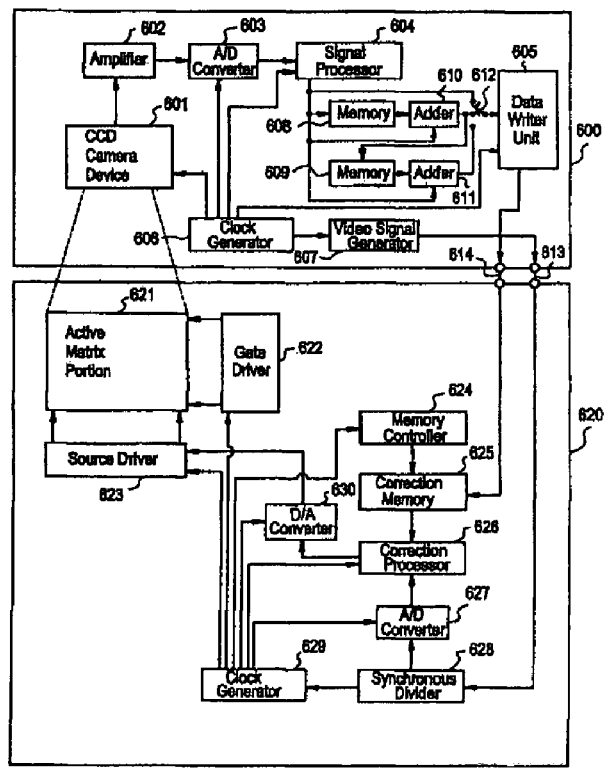

FIG. 6

Signed and Sealed this

Twenty-eighth Day of April, 2009

JOHN DOLL
*Acting Director of the United States Patent and Trademark Office*